United States Patent
Bera

(10) Patent No.: US 6,625,599 B1
(45) Date of Patent: Sep. 23, 2003

(54) METHOD AND APPARATUS FOR DATA SEARCHING AND COMPUTER-READABLE MEDIUM FOR SUPPLYING PROGRAM INSTRUCTIONS

(76) Inventor: Rajendra Kumar Bera, 640, Domlur Layout, 14th Cross Road, Bangalore 560071 (IN)

( * ) Notice: Subject to any disclaimer, the term of this patent is extended or adjusted under 35 U.S.C. 154(b) by 0 days.

(21) Appl. No.: 09/574,152

(22) Filed: May 18, 2000

(51) Int. Cl.[7] .......................... G06F 17/30; G06F 7/00
(52) U.S. Cl. ........................ 707/6; 707/3; 707/4; 707/5
(58) Field of Search ................... 707/1–10, 100–104.1; 382/229; 705/26, 27

(56) References Cited

U.S. PATENT DOCUMENTS

| | | | |
|---|---|---|---|
| 5,687,254 A | * 11/1997 | Poon et al. .................. 382/187 |
| 5,781,772 A | 7/1998 | Wilkinson, III et al. | |
| 5,953,727 A | * 9/1999 | Maslyn et al. ................. 435/6 |
| 5,972,693 A | * 10/1999 | Rothberg et al. ......... 435/287.2 |
| 6,023,683 A | * 2/2000 | Johnson et al. ................ 705/1 |
| 6,026,409 A | * 2/2000 | Blumenthal .............. 707/104.1 |
| 6,185,560 B1 | * 2/2001 | Young et al. ................... 707/6 |
| 6,189,013 B1 | * 2/2001 | Maslyn et al. ................ 702/20 |
| 6,278,993 B1 | * 8/2001 | Kumar et al. .................. 707/3 |
| 6,363,399 B1 | * 3/2002 | Maslyn et al. ........... 707/104.1 |

OTHER PUBLICATIONS

East Text Search Training, Jan. 2000, pp.: 20, 34, 37, 44, 49, 59, 100–104.*

* cited by examiner

Primary Examiner—Greta Robinson
Assistant Examiner—Linh Black
(74) Attorney, Agent, or Firm—De Penning & De Penning; Marc D. McSwain

(57) ABSTRACT

A method and apparatus for searching data to locate a portion identified by a search query. The data may comprise text files in a database. The search query comprises a sequence of two or more data fragments expected to be contained in the portion of data being sought. The method comprises receiving the data fragments and searching the data to locate the first fragment, then searching to find the location of the last. The method may include locating the earliest match between the data and the last data fragment which is preceded by matches between the data and each other fragment, the object being to find the shortest section of data which contains all the fragments in the right sequence and without overlapping one with another. The identified portion of text can be highlighted in a display of the data.

9 Claims, 3 Drawing Sheets

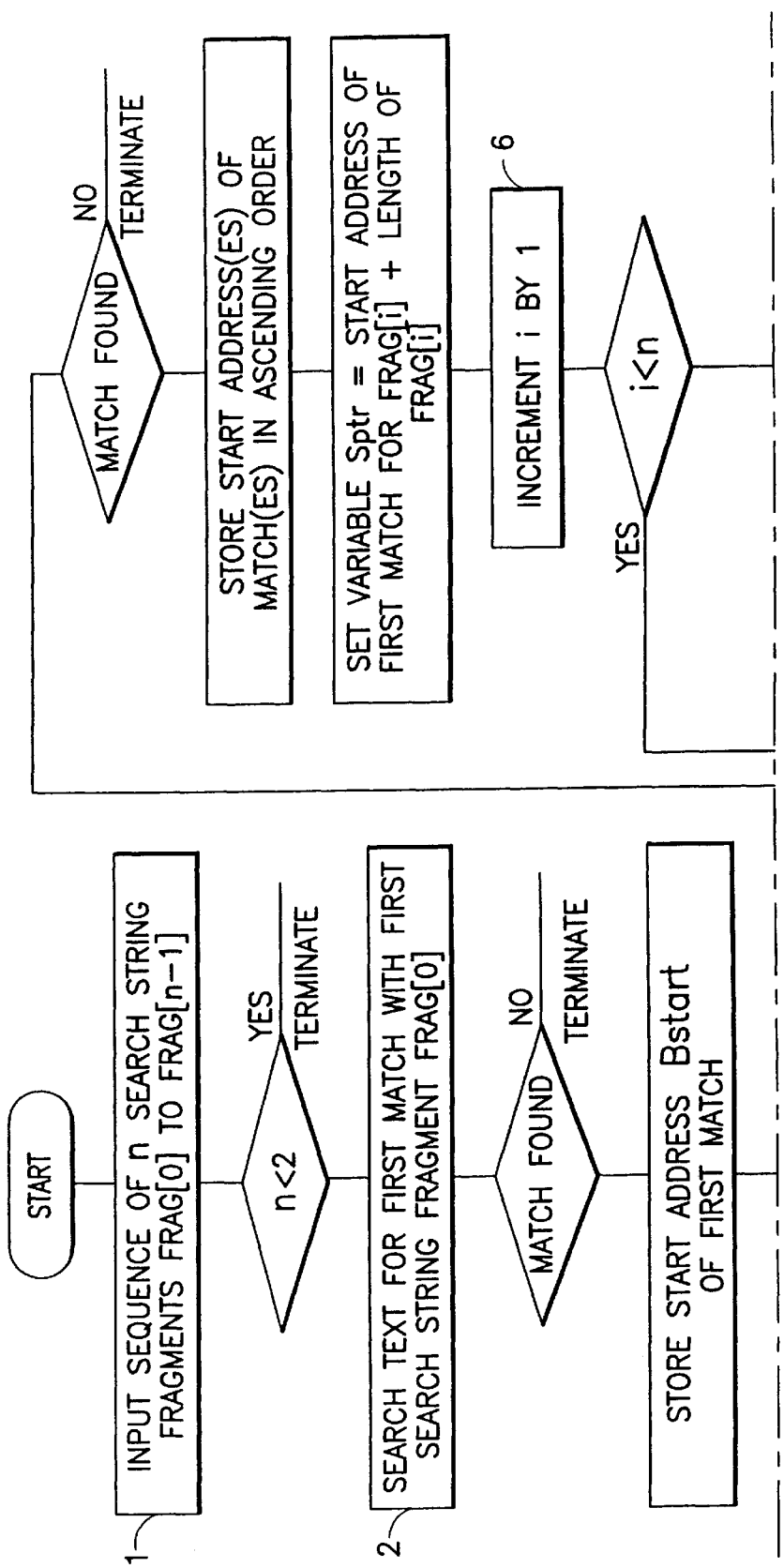

METHOD AND APPARATUS FOR DATA SEARCHING AND COMPUTER-READABLE MEDIUM FOR SUPPLYING PROGRAM INSTRUCTIONS

BACKGROUND OF THE INVENTION

This invention relates to a method and apparatus for data searching in a computer environment, that is to say a method and apparatus for acting upon a search query supplied to a computer by a user and for locating data in accordance with the query. More particularly, but not exclusively, the invention relates to a method and apparatus for locating a text string which may be present in a database of stored text files and which is in accordance with a user supplied search query.

The invention also relates to a computer readable medium operable for supplying instructions to a computer to cause it to operate or become operable in accordance with said method and apparatus.

In order to identify or locate particular documents or blocks of text in a data base of text files, it is known to provide a method and apparatus which can receive a user supplied search request comprising a particular text string and will carry out an hierarchical search through an indexed database to find a matching string within the database. One such known method and apparatus is disclosed in U.S. Pat. No 5,781,772 to Wilkinson, III et al. Also known are systems able to carry out Boolean searching in which documents stored in a database are located on the basis of a search query made up of two or more text strings linked by logical operators such as AND, OR and AND NOT. Special logical operators are also available sometimes, for example "near" where documents are located if two particular words appear next to each other or within a specified number of words from each other in the document.

The result of any large database search may well comprise many, perhaps a very large number of, 'hits', this being due to lack of knowledge or memory and/or the lack of a particular search capability. Thus, the user may know or remember only part of the information needed to aim the search more precisely or the search program may not allow discrimination of the order in which specific text strings from the search request appear in the target document.

One object of the invention is to make available a search algorithm which provides an additional functionality or an additional search query format for identifying documents and/or locating blocks of text in a database of text files.

Another object is to provide an apparatus and method for data searching able to better discriminate specific blocks of text identified by a search query.

SUMMARY OF THE INVENTION

According to one aspect of the invention, there is provided, in a computer environment, a method for searching data to locate a portion of said data identified by a search query, the method comprising:
receiving a sequence of two or more data fragments expected to be contained within said data;
searching the data to locate matches between the data and the respective data fragments; and
identifying a portion of said data from the address of a match with the first data fragment in the sequence and the address of a match with the last data fragment in the sequence.

Advantageously, the method further includes:
searching the data to locate the first match between the data and the first data fragment in the sequence;
searching the data to locate the last match between the data and the last data fragment in the sequence; and
identifying a portion of said data between the addresses of said first and said last match.

The method may also include:
searching the data to locate the first match between the data and the first data fragment in the sequence;
searching the data to locate matches between the data and the or each subsequent data fragment in the sequence;
identifying a portion of said data from the address of said first match between the data arid the first data fragment to the address of the first match between the data and the last data fragment in the sequence subsequent to at least one match between the data and any intermediate data fragment in the sequence.

In each case, the method may include displaying said data upon a display screen and highlighting said identified portion of data.

According to a second aspect of the invention, there is provided, in a computer environment, a method for searching data to locate a data item within the data, the method comprising:
receiving a search query comprising two or more data fragments contained in sequence in said data item;
searching said data to locate matches with the respective data fragments which matches are non-overlapping and in the same sequence as in said search query.

According to a third aspect of the invention, there is provided, in a computer environment, a method for searching a database to locate a data item, the method comprising:
storing two or more data fragments contained in sequence in said data item;
searching the data base to locate the first match with the first data fragment; and
searching the database to locate matches with the or each subsequent data fragment, said searching being directed in dependence upon the location(s) in the database of matches with the or each previous data fragment.

According to a fourth aspect of the invention, there is provided, in a computer environment, a method for searching a database to locate a specific data item, the method comprising:
storing two or more data fragments contained in sequence in said data item;
searching said database to locate the first match with the first data fragment in said sequence and storing the start address of said first match;
from the end address within the database at which said first match is located, searching said database to locate the last match with the last data fragment in said sequence and storing the end address of said last match;
from the said start address of said first match to the start address of said last match, searching said database to locate all matches with the first data fragment in said sequence; and
for each subsequent data fragment in turn, searching the database from the end address of the first match with the previous fragment to the said start address of said last match of said last fragment to locate all matches with each said subsequent data fragment.

According to a fifth aspect of the invention, there is provided an apparatus for searching data to locate a portion of said data identified by a search query, the apparatus comprising:

input means for receiving a sequence of two or more data fragments;

control means connected to said input means and said data supply means and operable for searching data made available by the data supply means to locate matches between the data and the respective data fragments, and for registering information identifying a portion of said data from the address of a match between the data and the first data fragment in the sequence to the address of a match between the data and the last data fragment in the sequence.

According to a sixth aspect of the invention, there is provided a computer readable medium containing a computer program for rendering a computer operable for searching data to locate a portion of the data identified by a user supplied search query, the program comprising:

computer code for enabling the computer to receive a sequence of two or more data fragments;

computer code for directing the computer to search said data to locate matches between the data and the respective data fragments; and computer code for causing the computer to identify a portion of said data from the location in said data of a first match between the data and the first data fragment in said sequence to the location of a match between the data and the last data fragment in the sequence.

These and further purposes and aspects of the present invention will be apparent from the ensuing particular description given with reference to the following drawings.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
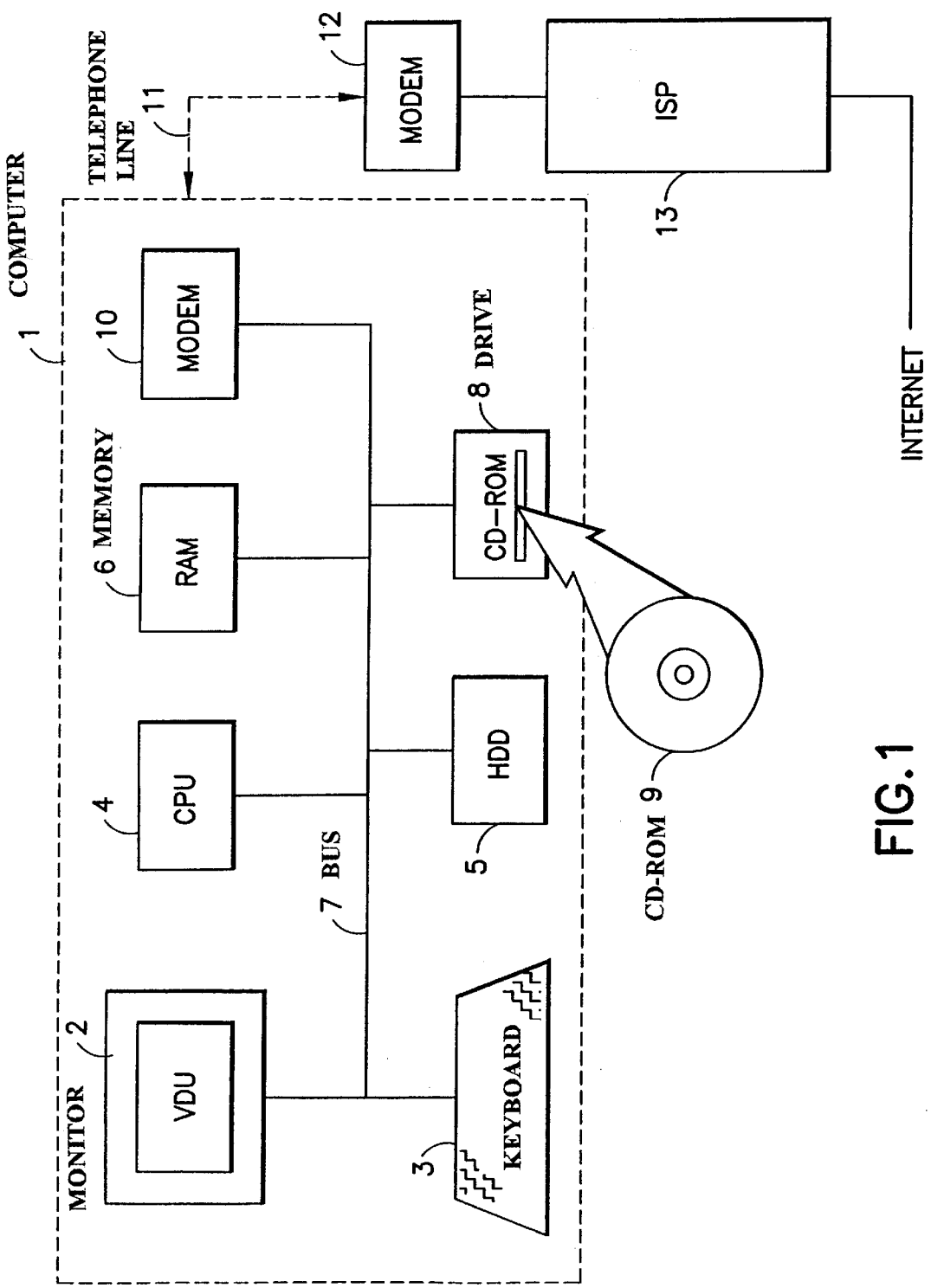
FIG. 1 is a block diagram of a computing environment.

The method described herein is intended to provide the following function. Namely, given a piece of text and a search request in the form of a sequence of two or more text fragments, where each text fragment is separated from the next by a separator symbol (say, ellipses), the task is to find the first minimal portion of text, from the beginning of the text, that contains the text fragments in the same sequence as encoded in the search request. The search is considered successful if such a minimal portion of text is found.

The minimal portion of text will contain only one complete sequence of the search text fragments, but it may contain additional instances of one or more text fragments from the search request and they may appear in sequences different from that encoded in the search request. Two or more text fragments may be identical, but the search algorithm to be described will treat each of them as separate entities.

If the search request contains only one text fragment, the minimal portion of text is simply the first occurrence of the text fragment in the given text. Specific examples of situations where the described function may be useful are as follows.

EXAMPLE 1

Let

"Once upon a time . . . palace . . . queen lived . . . roses in the garden"

be a search request. Here there are four text fragments—"Once upon a time", "a palace", "queen lived", "roses in the garden". Note that the text fragments are separated by ellipses (the separator symbol used here). Leading and trailing blanks in a text fragment, if present, are assumed to be part of the text fragment.

Now, if we are given a piece of text, say,

"Many stories begin with 'Once upon a time' such as the one that now follows: The old man began his story thus. Once upon a time there was a glorious king who built a palace so large that it was simply the largest one had ever built. The king had a queen and the queen lived in the palace. Inside the palace there was a rose garden. Everyday, her daughter, the princess, would go to see the roses in the garden. It gave her a lot of pleasure to be surrounded by their fragrance. One day a palace gardener came to pick some roses in the garden in that part of the palace where the queen lived. When he saw the queen . . . "

and the search request above the task is to find the minimal portion of text, from the beginning of the text, which satisfies the search request.

In this example, one will note that a successfull algorithm will find the minimal portion of text to be "Once upon a time there was a glorious king who built a palace so large that it was simply the largest one had ever built. The king had a queen and the queen lived in the palace. Inside the palace there was a rose garden. Everyday, her daughter, the princess, would go to see the roses in the garden".

Note that the text fragment "palace" appears, in the first instance, as a part of the search sequence, and in the other two instances, outside it.

EXAMPLE 2

Consider a list of addresses collated from a database by an application program in the form:

1. John M Smith, 10 Sycamore Road, Templeton City, N.J., USA
2. Carol Kline, #12 Melody Apartments, Springtown, Gardenia, Kans., USA
3. S Crooner, 123 Great Wood Street, Humphrey Town, Tex., USA
4 Jack S Brody, 431 Pine Avenue, Rose Town, New Castle, England.

Now a search request, such as, "Kline . . . ardenia . . . as" acting on each record will find it in the record:

Carol Kline, #12 Melody Apartments, Springtown, Gardenia, Kans., USA

Note that in this example the database was not directly searched but the output produced by an application program acting on a database was. This technique can be used on any database for datamining. The intelligence will lie in what information the application program is asked to collate from the database, how the collated information is formatted, how the pointers to the database records are maintained with respect to the collated information and how the search request is framed. Also note that here each record, in turn, was considered as the given text rather than the whole list to avoid a spurious match occurring across two or more records.

EXAMPLE 3

A researcher searching a journal database can make use of prior knowledge of conventional formatting of scientific articles and make a search request, such as "The role of . . . proteins . . . Mike . . . Smith . . . Introduction . . . in cell membrane . . . Conclusions . . . DNA sequence"

where he remembers fragments from the articles's title, an incomplete name (or names) from the authors' list, that a phrase appears after (or perhaps in) the Introduction section, and that a phrase appears after (or perhaps in) the Conclusions section of the article.

As well as for text searching, the search method apparatus and program according to this invention can be used in several other situations, for example:

1 Searching for DNA sequences in a genome where it is desired to find DNA segments with unknown spacings in-between segments (to help, for example, in the hunt for genes and proteins they encode which may have therapeutic value. Note that 97% of DNA's code is not genes, so a good search technique can be truly useful).

2 Data mining—searching database records without an explicit reference to data fields. For example, a list of addresses, created as a text file collated from a database by an application program can be used to search for people regarding whom only fragmentary information is available. Here the structure of the database is immaterial, but the text file created by the application program is important. (See Example 2 above.)

3 Web search. More meaningful search of documents on the Web. When keyword searches on the Web produce a very long list of documents, search algorithms such as this can automate the further search of the listed documents for their relevance, specially, when used by domain experts searching documents in their domain of expertise. (See Example 3 above).

4 Searching for code segments following certain patterns in very large codes.

FIG. 1 shows one embodiment of a computing environment in which the present invention may be implemented.

This embodiment comprises a so-called stand alone computer 1, i.e., one which is not permanently linked to a network, including a display monitor 2, a keyboard 3, a microprocessor—based central processing unit 4, a hard-disc drive 5 and a random access memory 6 all coupled one to another by a connection bus 7. The keyboard 3 is operable for enabling the user to enter commands into the computer along with user data such as a search query. As well as keyboard 3, the computer may comprise a mouse or tracker ball (not shown) for entering user commands especially if the computer is controlled by an operating system with a graphical user interface.

To introduce program instructions into the computer 1 i.e., to load them into the memory 6 and/or store them onto the disc drive 5 so that the computer begins to operate, and/or is made able to operate when commanded, in accordance with the present invention the computer 1 comprises a CD-ROM drive 8 for receiving a CD-ROM 9.

The program instructions are stored on the CD-ROM 9 from which they are read by the drive 8. However, as will be well understood by those skilled in the art, the instructions as read by the drive 8 may not be usable directly from the CD-ROM 9 but rather may be loaded into the memory 6 and stored in the hard disc drive 5 and used by the computer 1 from there. Also, the instructions may need to be decompressed from the CD-ROM using appropriate decompression software on the CD-ROM or in the memory 6 and may, in any case, be received and stored by the computer 1 in a sequence different to that in which they are stored on the CD-ROM.

In addition to the CD-ROM drive 8, or instead of it, any other suitable input means could be provided, for example a floppy-disc drive or a tape drive or a wireless communication device, such as an infra-red receiver (none of these devices being shown).

Finally, the computer 1 also comprises a telephone modem 10 through which the computer is able temporarily to link up to the Internet via telephone line 11, a modem 12 located at the premises of an Internet service provider (ISP), and the ISP's computer 13.

The computer 1 does not have to be in a stand alone environment. Instead, it could form part of a network (not shown) along with other computers to which it is connected on a permanent basis. It could also be permanently coupled to or have a temporary link to a so-called intranet, i.e., a group of data holding sites similar to internet sites or URL's and arranged in the same way as the Internet but accessible only to particular users, for example the employees of a particular company. Instead of modem 10, the computer 1 could have a digital hard-wired link to the ISP's computer 13 or the computer 1 could itself comprise a permanently connected Internet site (URL) whether or not acting as an ISP for other remote users. In other words, instead of the invention being usable only through the local keyboard 3, it may be available to remote users working through temporary or permanent links to computer 1 acting as ISP or simply as an Internet site.

The data to be searched could be data which has been entered into the computer via the keyboard 3, perhaps over a long period, and stored on the hard disc drive 5 or on another CD-ROM entered in the drive 8, assuming the drive and the other CD-ROM are capable of re-writing data to the CD-ROM, or on the aforementioned optional floppy disc-disc or tape drive. The data to be searched could also be data which is stored on the CD-ROM 9 along with the program instructions, or it could be data which is available from say a file server (not shown) forming part of the aforementioned network, or from data holding sites within the Internet or the aforementioned intranet.

Figure 2B:
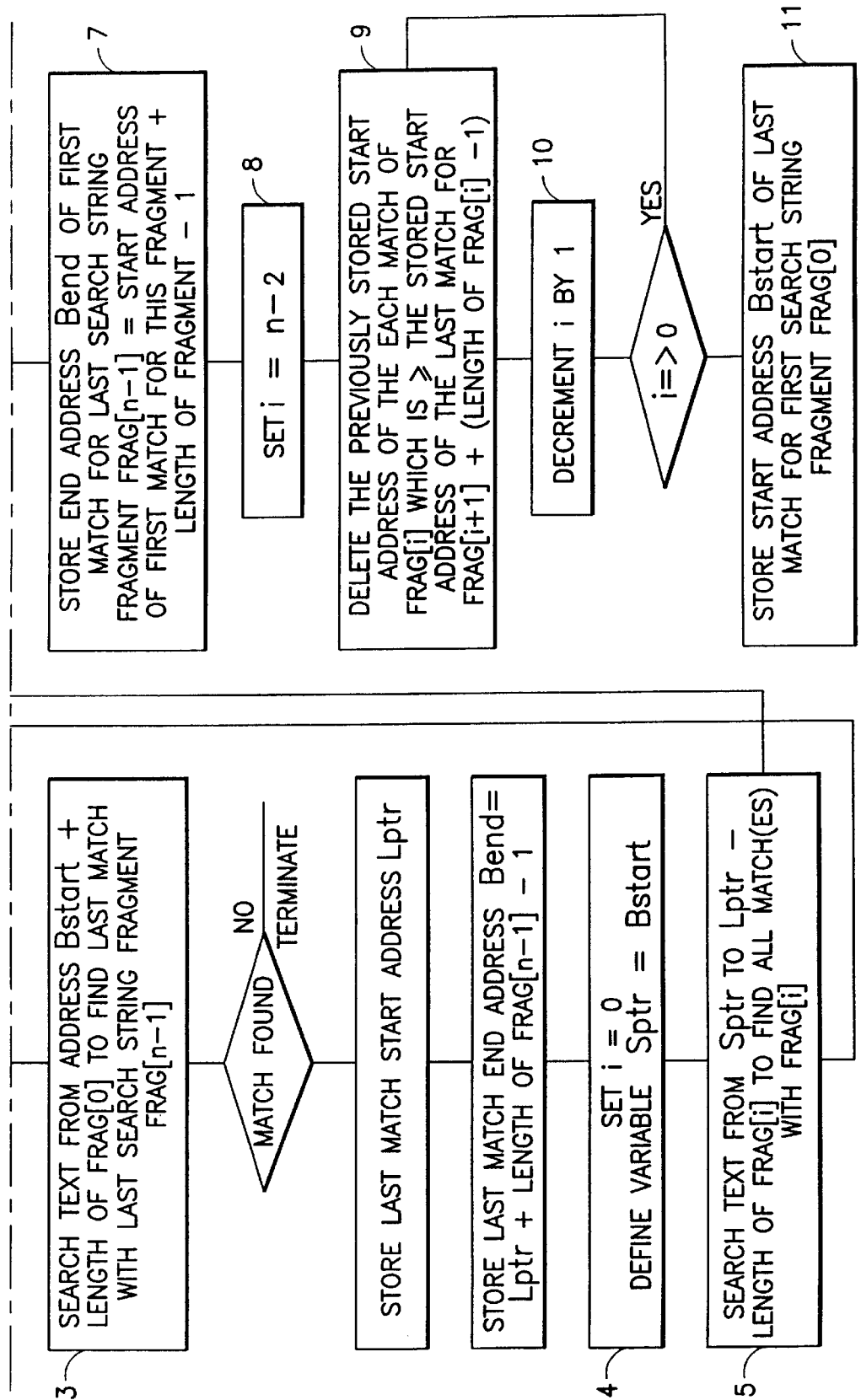
FIG. 2 is a flow chart showing a data search process.

The search method will be described below with reference to drawing FIG. 2. First however it will be appreciated that the given text and/or the text fragments in the search request can be formatted to a standard form before beginning the search. This is recommended although it is not referred to in FIG. 2. In this standard form, for example, multiple consecutive blanks can be replaced by a single blank; a blank before certain punctuation marks (stop, comma, semicolon, colon, hyphen, exclamation mark, question mark, etc.), if found, is removed; a blank is placed after such punctuation marks, if not found; etc. The standard formatting helps, for example, if the text being searched has not been professionally edited.

The search method is intended to find the minimal portion of text, b, as defined above, and to find the largest block of text, B, which begins with the first text fragment in the search request (this will be "Once upon a time" in Example 1) and ends with the last text fragment in the search request (this will be "roses in the garden" in Example 1) within which b is embedded.

The computer code executing the algorithm can easily incorporate user friendly features such as highlighting the blocks b and B as well as highlighting text fragments within them.

In what follows, familiarity with C programming language conventions has been assumed. Naturally it will be appreciated that the method described could be implemented in another programming language possibly with appropriate modifications to suit the language. It also assumes that there are at least two text fragments in the search string. The flow chart of FIG. 2 is more general as regards the implementation language although it is still at least partly reflective of a C programming environment. In the flowchart, the reference numbers correspond to the paragraph numbers below. The search method comprises the following steps:

1 Create a string array variable and call it frag[ ] and fill this array with the text fragments in the same sequence as they appear in the search request. Let there be n such strings stored in frag[0] to frag[n-1]. For Example 1 above, it will produce:

frag[0]="Once upon a time"
frag[1]="palace"
frag[2]="queen, lived"
frag[3]="roses in the garden"

For each variable frag[i] create a corresponding list variable, ptrs_to_frag[i], to store the list of pointers to frag[i] from the runtime designated portions of the given text. If n<2, terminate the process with an error message (such as, "Invalid call to the text search algorithm").

2 Let Bstart and Bend, respectively, denote the beginning and terminal addresses of block B. To determine Bstart, scan the given text for the first appearance of the first text fragment (this is stored in frag[0]), say using the 'strstr( ) function in C. If the pointer is found then this pointer will be Bstart. If the pointer is not found, terminate the process since the search request cannot be fulfilled.

3 To determine Bend, scan the given text from Bstart+strlen (frag[0]), for the last appearance of the last text fragment (this is stored in frag[n-1]). If found, call the pointer Lptr and put Bend=Lptr strlen(frag[n-1])-1. If no Lptr is found, terminate the process since the search request cannot be fulfilled.

4 Put i=0. Define Sptr=Bstart.

5 Find all pointers pointing to frag[i], beginning at or lying between Sptr and Lptr−strlen(frag[i]), and store them in ascending order in ptrs_to_frag[i]. If no pointer is found, then terminate the procedure since the search request cannot be fulfilled. Otherwise, put

*Sptr*=first pointer stored in *ptrs*_to_frag[*i*]+*strlen*(frag[*i*]).

This ensures that frag[i+1], if found, will be preceded by at least one instance of frag[i] in B without any overlap between the two frag[ ]s.

6 Increment i by 1. If i<n go to step 5, else go to step 7.

7 To, determine b, we need to find its starting address bstart and its terminal address bend. If we define lptr as given by

*lptr*=first pointer stored in *ptrs*_to_frag[*n*−1], then bend=*lptr*+*strlen*(frag[*n*−1])−1.

Except for lptr, delete all other pointers saved in the list ptrs_to_frag[n-1].

8 Put i=n-2. (Recall that this algorithm is executed only if n≧2.)

9 Delete from ptrs_to_frag[i] all such pointers to which, if strlen (frag[i])-1 is added, will point to an address larger than or equal to the last pointer currently stored in ptrs_to_frag[i+1]. This operation will not empty ptrs_to_frag[i] since step 5 has already ensured that there will be at least one instance of frag[i] preceding the instances of frag[i+1] whose pointers are saved in ptrs_to_frag[i+1] without any overlap between frag[i] and frag[i+1].

10 Decrement i by 1. If i≧o go to step 9, else go to step 11.

11 Put bstart last pointer stored in ptrs_to_frag[0].

Note that steps 2 and 3 define B, which may be highlighted by the code executing this algorithm, while steps 7 to 11 define b. This may also be highlighted.

A Worked Example

Consider Example 1 cited above.

The given text is

"Many stories begin with 'Once upon a time' such as the one that now follows: The old man began his story thus. Once upon a time there was a glorious king who built a palace so large that it was simply the largest one had ever built. The king had a queen and the queen lived in the palace. Inside the palace there was a rose garden. Every day, her daughter, the princess, would go to see the roses in the garden. It gave her a lot of pleasure to he surrounded by their fragrance. One day a palace gardener came to pick some roses in the garden in that part of the palace where the queen lived. When he saw the queen . . . ", and the search request is "Once upon a time . . . palace . . . queen lived . . . roses in the garden".

Step 1.n=4. The string array frag[ ] is frag[0]="Once upon a time"
frag[1]="palace"
frag[2]="queen lived"
frag[3]="roses in the garden"

Step 2. Let the starting address of the given text be, say, 1000. A search for frag[0]="Once upon a time" will return the pointer 1025. Thus Bstart=1025. Since a pointer has been found, we go to step 3.

Step 3. A search for the last appearance of frag[n-1]= "roses in the garden" in the given text will return the pointer Lptr=1522. Thus, Bend=Lptr+strlen (frag[n-1])-1=1522+ 19-1=1540. Now go to step 4.

Step 4. Put i=0. define Sptr=Bstart=1025.

Steps 5 and 6. These steps produce the result.

ptrs_to_frag[0] has the entries 1025, 1111.
ptrs_to_frag[1] has the entries 1166, 1281, 1300, 1488
ptrs_to_frag[2] has the entries 1262
ptrs_to_frag[3] has the entries 1390, 1522.

Since all the lists are populated with pointers, we go to step 7.

Step 7. The minimal portion of text b is bounded by the pointers bstart and bend. From ptrs_to_frag[3] we find

*lptr*=1390 bend=1390+19−1=1408

Keep lptr and delete all other pointers from ptrs_to_frag [3] so that ptrs_to_frag[3] now has the single entry 1390.
Step 8. Put i=4-2=2. Since n>2, go to step 9
Steps 9 and 10. These steps produce the result
ptrs_to_frag[2] has the entries 1262.
ptrs_to_frag[1] has the entries 1166.
ptrs_to_frag[0] has the entries 1025, 1111.

Step 11. bstart=1111. Thus b starts at 1111 and ends at 1408.

Pseudocode Fragment for the Search Algorithm

```
// Given: text, n, and frag[0] to frag[n-1].
// Step 2
   Bend=NULL;
   Bstart=strstr(text, frag[0]);
   if (!Bstart) terminate execution.
// Step 3
   Lptr=strstr (Bstart+strlen(frag[0]), frag[n-1]);
   if (!Lptr) terminate execution.
   while (TRUE) {
   Bend=Lptr+strlen (frag[n-1])-1;
   Lptr=strstr (Bend+1, frag[n-1]);
   if (!Lptr) break;
   }
// Step 4
   Sptr=Bstart;
// Steps 5 and 6
   for (i=0; i<n; i++) {
      Save all pointers beginning at or lying between Sptr
         and Lptr-strlen (frag[i]), in the list ptrs_to_frag[i].
      If the list ptrs_to_frags[i] is empty, terminate execution;
      else redefine Sptr=first pointer stored in ptrs_to_frag[i]+
         strlen (frag[i]).
   }
//Step 7
   lptr=first pointer stored in ptrs_to_frag[n-1];
   bend=lptr+strlen (frag[n-1])-1;
   Delete all pointers stored in the list ptrs_to_frag[n-1]
      except lptr.
//Steps 8 to 10
   for (i=n-2; i>=0; i--){
      Delete from ptrs_to_frag[i] all such pointers to which,
         if strlen (frag[i])-1 is added, will point to an
         address>=The last pointer in ptrs_to_frag [i+1].
   }
// Step II
   bstart=last pointer saved in ptrs_to_frag[0].
```

Whilst a particular preferred embodiment of the invention has been shown and described herein it will be understood that persons of skill in the art may modify the embodiment and that such modifications and developments are within the purview of the invention as described or claimed.

What is claimed is:

1. In a computer environment, a method for searching data to locate a portion of said data identified by a search query, the method comprising:

receiving a sequence of two or more data fragments expected to be contained within said data;

searching the data to locate matches between the data and the respective data fragments; and identifying a portion of said data from the address of a match with the first data fragment in the sequence and the address of a match with the last data fragment in the sequence.

2. A method according to claim 1, including:

searching the data to locate the first match between the data and the first data fragment in the sequence;

searching the data to locate the last match between the data and the last data fragment in the sequence; and identifying a portion of said data between the addresses of said first and said last match.

3. A method according to claim 1, including:

searching the data to locate the first match between the data and the first data fragment in the sequence;

searching the data to locate matches between the data and the or each subsequent data fragment in the sequence;

identifying a portion of said data from the address of said first match between the data and the first data fragment to the address of the first match between the data and the last data fragment in the sequence subsequent to at least one match between the data and any intermediate data fragment in the sequence.

4. A method according to claim 1, including displaying said data upon a display screen and highlighting said identified portion of data.

5. In computer environment, a method for searching data to locate a data item within the data, the method comprising:

receiving a search query comprising two or more data fragments contained in sequence in said data item;

searching said data to locate matches with the respective data fragments which matches are non-overlapping and in the same sequence as in said search query, wherein spacings between said data fragments are not specified in said search query; and identifying a portion of said data between addresses of a first match between the data and a first data fragment in the sequence and a last match between the data and a last data fragment in the sequence.

6. In a computer environment, a method for searching a database to locate a data item, the method comprising:

storing two or more data fragments contained in sequence in said data item;

searching the data base to locate the first match with the first data fragment; and searching the database to locate matches with the or each subsequent data fragment, said searching being directed in dependence upon the location(s) in the database of matches with the or each previous data fragment.

7. In a computer environment, a method for searching a database to locate a specific data item, method comprising:

storing two or more data fragments contained in sequence in said data item;

searching said database to locate the first match with the first data fragment in said sequence and storing the start address of said first match;

from the end address within the database at which said first match is located, searching said database to locate the last match with the last data fragment in said sequence and storing the end address of said last match;

from the said start address of said first match to the start address of said last match, searching said database to locate all matches with the first data fragment in said sequence; and for each subsequent data fragment in turn, searching the database from the end address of the first match with the previous fragment to the said start address of said last match of said last fragment to locate all matches with each said subsequent data fragment.

8. An apparatus for searching data to locate a portion of said data identified by a search query, the apparatus comprising:

input means for receiving a sequence of two or more data fragments;

control means connected to said input means and said data supply means and operable for searching data made available by the data supply means to locate matches between the data and the respective data fragments, and for registering information identifying a portion of said data from the address of a match between the data and the first data fragment in the sequence to the address of a match between the data and the last data fragment in the sequence.

9. A computer readable medium containing a computer program for rendering a computer operable for searching data to locate a portion of the data identified by a user supplied search query, the program comprising:

computer code for enabling the computer to receive a sequence of two or more data fragments;

computer code for directing the computer to search said data to locate matches between the data and the respective data fragments; and computer code for causing the computer to identify a portion of said data from the location in said data of a first match between the data and the first data fragment in said sequence to the location of a match between the data and the last data fragment in the sequence.

* * * * *